United States Patent
Bang

(10) Patent No.: US 10,479,352 B2
(45) Date of Patent: Nov. 19, 2019

(54) APPARATUS AND METHOD FOR CONTROLLING ENGINE CLUTCH

(71) Applicant: Hyundai Motor Company, Seoul (KR)

(72) Inventor: Jae Sung Bang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 549 days.

(21) Appl. No.: 14/751,244

(22) Filed: Jun. 26, 2015

(65) Prior Publication Data

US 2016/0137191 A1 May 19, 2016

(30) Foreign Application Priority Data

Nov. 19, 2014 (KR) .................. 10-2014-0161872

(51) Int. Cl.
*B60W 20/40* (2016.01)
*B60W 30/20* (2006.01)
(Continued)

(52) U.S. Cl.
CPC ............. *B60W 20/40* (2013.01); *B60K 6/387* (2013.01); *B60K 6/48* (2013.01); *B60W 10/02* (2013.01);
(Continued)

(58) Field of Classification Search
CPC .......... B60W 2050/0056; B60W 20/40; Y02T 10/6286
(Continued)

(56) References Cited

U.S. PATENT DOCUMENTS 4,114,583 A * 9/1978 Sleder .................. F02B 61/045
123/406.57
9,399,457 B2 * 7/2016 Gibson ................. B60W 10/02
(Continued)

FOREIGN PATENT DOCUMENTS

CN 101977803 A 2/2011
CN 102656039 A 9/2012
(Continued)

OTHER PUBLICATIONS

Partial European Search Report for European Patent Application No. 15177330, dated Sep. 19, 2016, 8 pages.
(Continued)

*Primary Examiner* — Minh Truong
*Assistant Examiner* — Michael E Butler
(74) *Attorney, Agent, or Firm* — Mintz Levin Cohn Ferris Glovsky and Popeo, P.C.; Peter F. Corless

(57) ABSTRACT

A method and an apparatus for controlling an engine clutch are provided. The method includes determining whether an engine start condition is satisfied when an engine is stopped and performing an engine cranking operation by operating a hybrid starter & generator (HSG) when the engine start condition is satisfied. Whether an engine speed is greater than or equal to a first reference speed is determined to thus reduce an HSG torque. Then, whether the engine speed is greater than or equal to a second reference speed is determined to thus calculate a target speed of the engine. A speed control of the engine is performed using the target speed of the engine while determining whether an engine clutch engagement condition is satisfied. An engine clutch is engaged when the engine clutch engagement condition is satisfied.

15 Claims, 7 Drawing Sheets

(51) Int. Cl.
| | |
|---|---|
| B60W 10/02 | (2006.01) |
| B60W 10/06 | (2006.01) |
| B60K 6/48 | (2007.10) |
| B60W 10/08 | (2006.01) |
| F02D 41/06 | (2006.01) |
| F02N 11/04 | (2006.01) |
| F02D 31/00 | (2006.01) |
| B60K 6/387 | (2007.10) |
| B60W 20/11 | (2016.01) |
| B60W 50/00 | (2006.01) |
| F02D 41/02 | (2006.01) |
| F02N 11/08 | (2006.01) |

(52) U.S. Cl.
CPC ............ *B60W 10/06* (2013.01); *B60W 10/08* (2013.01); *B60W 20/11* (2016.01); *B60W 30/20* (2013.01); *F02D 31/001* (2013.01); *F02D 41/062* (2013.01); *F02N 11/04* (2013.01); *B60K 2006/4825* (2013.01); *B60W 2030/206* (2013.01); *B60W 2050/006* (2013.01); *B60W 2050/0008* (2013.01); *B60W 2050/0012* (2013.01); *B60W 2050/0052* (2013.01); *B60W 2050/0056* (2013.01); *B60W 2510/025* (2013.01); *B60W 2510/0208* (2013.01); *B60W 2510/0241* (2013.01); *B60W 2510/0266* (2013.01); *B60W 2510/0638* (2013.01); *B60W 2510/0695* (2013.01); *B60W 2510/08* (2013.01); *B60W 2510/081* (2013.01); *B60W 2710/021* (2013.01); *B60W 2710/06* (2013.01); *B60W 2710/0644* (2013.01); *B60W 2710/0666* (2013.01); *B60W 2710/081* (2013.01); *B60W 2710/083* (2013.01); *F02D 41/022* (2013.01); *F02D 2200/101* (2013.01); *F02D 2250/18* (2013.01); *F02N 11/0818* (2013.01); *F02N 2300/104* (2013.01); *Y02T 10/6221* (2013.01); *Y02T 10/6252* (2013.01); *Y02T 10/6286* (2013.01); *Y10S 903/93* (2013.01)

(58) Field of Classification Search
USPC ............................................................ 701/22
See application file for complete search history.

(56) References Cited

U.S. PATENT DOCUMENTS

| | | | |
|---|---|---|---|
| 10,012,200 B2* | 7/2018 | Johri | F02N 11/0803 |
| 2002/0050259 A1* | 5/2002 | Kojima | B60K 6/365 |
| | | | 123/179.3 |
| 2003/0097193 A1* | 5/2003 | Makino | G05B 5/01 |
| | | | 700/42 |
| 2011/0015032 A1* | 1/2011 | Beer | B60W 10/02 |
| | | | 477/5 |
| 2012/0042642 A1 | 2/2012 | Meinheit et al. | |
| 2013/0291830 A1* | 11/2013 | Doering | F02D 41/023 |
| | | | 123/350 |
| 2015/0167614 A1* | 6/2015 | Malone | F02N 11/0822 |
| | | | 701/54 |

FOREIGN PATENT DOCUMENTS

| | | |
|---|---|---|
| CN | 103946091 A | 7/2014 |
| CN | 104044582 A | 9/2014 |
| DE | 102008036166 A1 | 2/2010 |
| EP | 1201479 A2 | 5/2002 |
| JP | 3775568 B2 | 5/2006 |
| JP | 2010-188859 A | 9/2010 |
| KR | 10-2014-0048586 A | 4/2014 |
| KR | 10-2014-0079157 A | 6/2014 |

OTHER PUBLICATIONS

European Search Report for European Patent Application No. 15177330.6, dated Feb. 10, 2017, 13 pages.

* cited by examiner

APPARATUS AND METHOD FOR CONTROLLING ENGINE CLUTCH

CROSS-REFERENCE TO RELATED APPLICATION

This application claims priority to and the benefit of Korean Patent Application No. 10-2014-0161872 filed in the Korean Intellectual Property Office on Nov. 19, 2014, the entire contents of which are incorporated herein by reference.

BACKGROUND (a) Field of the Invention

The present invention relates to an apparatus and a method for controlling an engine clutch.

(b) Description of the Related Art

As is generally known in the art, a hybrid vehicle uses an internal combustion engine and battery power supply together. In other words, the hybrid vehicle uses a combination of torque of the internal combustion engine and torque of a motor. In general, the hybrid vehicle includes an engine, a motor, an engine clutch configured to adjust torque between the engine and the motor, a transmission, a differential gear device, a high voltage battery, a hybrid starter & generator (HSG) configured to start the engine or generate power based on an output of the engine, and wheels. The HSG may refer to an integrated starter & generator (ISG).

The hybrid vehicle is capable of being driven in an electric vehicle (EV) mode in which torque of a motor is used by engaging or releasing (e.g., disengaging) the engine clutch based on acceleration or deceleration intention according to a manipulation of an accelerator pedal and a brake pedal, a vehicle speed, a state of charge (SOC) of the battery, and the like; a hybrid electric vehicle (HEV) mode in which torque of the engine is used as main power and torque of the motor is used as auxiliary power; and a regenerative braking mode in which braking and inertial energy are recovered through electrical power generation of the motor during braking the vehicle or during driving of the vehicle by inertia to be charged in the high voltage battery. Since the hybrid vehicle uses both of mechanical energy of the engine and electrical energy of the battery, uses optimal operation regions of the engine and the motor, and recovers the energy upon braking, fuel efficiency may be improved and the energy may be efficiently used.

In the method for controlling the engine clutch according to the related art, when the EV mode is switched to the HEV mode (i.e., when the engine starts), after engine speed is synchronized to motor speed, drivability may be ensured to prevent engagement shock from occurring while torque is delivered between an engine and a motor which are different torque sources by engaging an engine clutch. In particular, a target speed of the engine (i.e., target speed of an input shaft of the engine clutch) is generated based on motor speed (i.e., speed of an output shaft of engine clutch) using a filter, and the engine speed is adjusted to track (e.g., to correspond to) the target speed. However, as shown in FIG. 7, when the target speed of the engine is time-varied or a disturbance occurs, precise control may be difficult using the method for operating the engine clutch according to the related art. Therefore, overshoot of the engine speed may occur, a time required to engage the engine clutch is increased, and engagement shock may occur.

The above information disclosed in this section is merely for enhancement of understanding of the background of the invention and therefore it may contain information that does not form the prior art that is already known in this country to a person of ordinary skill in the art.

SUMMARY

The present invention provides an apparatus and a method for controlling an engine clutch having advantages of reducing a time required to engage an engine clutch and engagement shock when a mode of a hybrid vehicle is switched from an EV mode to an HEV mode.

A method for controlling an engine clutch according to an exemplary embodiment of the present invention may include: determining whether an engine start condition is satisfied when an engine is stopped; performing an engine cranking operation by driving a hybrid starter & generator (HSG) when the engine start condition is satisfied; determining whether an engine speed is greater than or equal to a first reference speed; reducing an HSG torque when the engine speed is greater than or equal to the first reference speed; determining whether the engine speed is greater than or equal to a second reference speed; calculating a target speed of the engine when the engine speed is greater than or equal to the second reference speed; performing speed control of the engine using the target speed of the engine; determining whether an engine clutch engagement condition is satisfied while performing the speed control; and engaging an engine clutch when the engine clutch engagement condition is satisfied.

The performing of the engine cranking operation by driving the HSG may include increasing the engine speed by maintaining a maximum HSG torque. The method may further include continuously maintaining the maximum HSG torque when the engine speed is less than the first reference speed. The calculating the target speed of the engine may include: calculating initial offset based on the second reference speed and a motor speed when the engine speed reaches the second reference speed; dividing the initial offset to generate an offset input; and interpolating the offset input to generate an interpolated offset input.

The dividing of the initial offset to generate the offset input may include: dividing a range from 0 to the initial offset into a plurality of sub-ranges; determining a slope that corresponds to the respective sub-ranges; and generating the offset input which is increased with respective to the determined slope. The dividing of the initial offset to generate the offset input may include: calculating a first value that corresponds to a first preset ratio of the initial offset; calculating a second value that corresponds to a second preset ratio of the initial offset; generating the offset input which is increased with respect to a first slope until the offset input reaches from 0 to the first value; when the offset input reaches the first value, generating the offset input which is increased with respect to a second slope until the offset input reaches the second value from the first value; and when the offset input reaches the second value, generating the offset input which is increased with respect to a third slope until the offset input reaches the initial offset from the second value.

The first slope may be determined by considering (e.g. based on) a slope of the engine speed at the time when the engine speed reaches the second reference speed. The second slope $\Delta_2$ may be determined by considering (e.g., based on) the first slope among values satisfying an equation of $$\Delta_2 \le \frac{\text{Max}TQ}{J},$$

where the MaxTQ is a maximum torque that a torque source including the engine and the HSG outputs in a current running state, and the J is inertia of an input shaft of the engine clutch. The third slope may be determined by considering (e.g., based on) the second slope and a slope of the motor speed.

The dividing of the initial offset to generate the offset input may include: determining a target time at which engagement of the engine clutch is completed based on the initial offset; dividing an interval from the time at which the engine speed reaches the second reference speed to the target time into a plurality of sub-intervals; determining a slope that corresponds to the respective sub-intervals; and generating the offset input which is increased with the determined slope.

The plurality of sub-intervals may include a first sub-interval, a second sub-interval, and a third sub-interval, and a first slope that corresponds to the first sub-interval may be determined by considering a slope of the engine speed at the time when the engine speed reaches the second reference speed. A second slope $\Delta_2$ that corresponds to the second sub-interval may be determined by considering the first slope among values satisfying an equation of $$\Delta_2 \le \frac{\text{Max}TQ}{J},$$

where the MaxTQ is a maximum torque that a torque source including the engine and the HSG outputs in a current running state, and the J is inertia of an input shaft of the engine clutch. A third slope that corresponds to the third sub-interval may be determined by considering the second slope and a slope of the motor speed.

The calculation of the target speed of the engine may further include: calculating a difference between the motor speed and the initial offset; and adding the interpolated offset input to the difference between the motor speed and the initial offset. The performing of the speed control of the engine may include: calculating a difference between the target speed of the engine and a current speed of the engine; calculating feedback control input using the difference between the target speed of the engine and the current speed of the engine; calculating feed-forward control input using inertia of an input shaft of the engine clutch and the target speed of the engine; calculating disturbance control input using a nominal inverse model and at least one low pass filter based on the current speed of the engine; and calculating a torque command using the feedback control input, the feed-forward control input, and the disturbance control input.

In particular, the nominal inverse model $G_n^{-1}(s)$ may be designed to satisfy an equation of $G_n^{-1}(s)=J \times s$, where the J is the inertia of the input shaft of the engine clutch. The low pass filter $Q(s)$ may be designed to satisfy an equation of $$Q(s) = \frac{\sum_{g=1}^{m} b_g s^g}{\sum_{h=1}^{n} a_h s^h},$$

where n is greater than or equal to m, $a_h$ and $b_g$ are design parameters and are designed to satisfy an equation of $|Q(s=jw)|_{w \sim w_m} \approx 1$ at a maximum frequency $w_m$ or lower included in the disturbance.

The engine clutch engagement condition may be satisfied when an equation of $|W_O - W_I| \le W_1$ is satisfied, where the $W_O$ is a motor speed, the $W_I$ is the engine speed, and the $W_1$ is a first preset value. The engine clutch engagement condition may be satisfied when an equation of $|W_O - W_I| \le W_1$ and an equation of $$\frac{d}{dt}(|W_O - W_I|) \le W_2$$

are simultaneously satisfied, where the $W_O$ is a motor speed, the $W_I$ is the engine speed, the $W_1$ is a first preset value, and the $W_2$ is a second preset value.

An apparatus for controlling an engine clutch according to an exemplary embodiment of the present invention may include: a data detector configured to detect data for operating the engine clutch; a torque source connected to an input shaft of the engine clutch and including an engine and a hybrid starter & generator (HSG); and a controller executed by a predetermined program to operate the engine clutch based on the data.

As described above, in accordance with an exemplary embodiment of the present invention, when a mode of the hybrid vehicle is switched from the EV mode to the HEV mode, a time required to engage the engine clutch and engagement shock may be reduced by using speed adjustment of the engine.

BRIEF DESCRIPTION OF THE DRAWINGS

The above and other objects, features and advantages of the present disclosure will be more apparent from the following detailed description taken in conjunction with the accompanying drawings.

DESCRIPTION OF SYMBOLS

Figure 1:
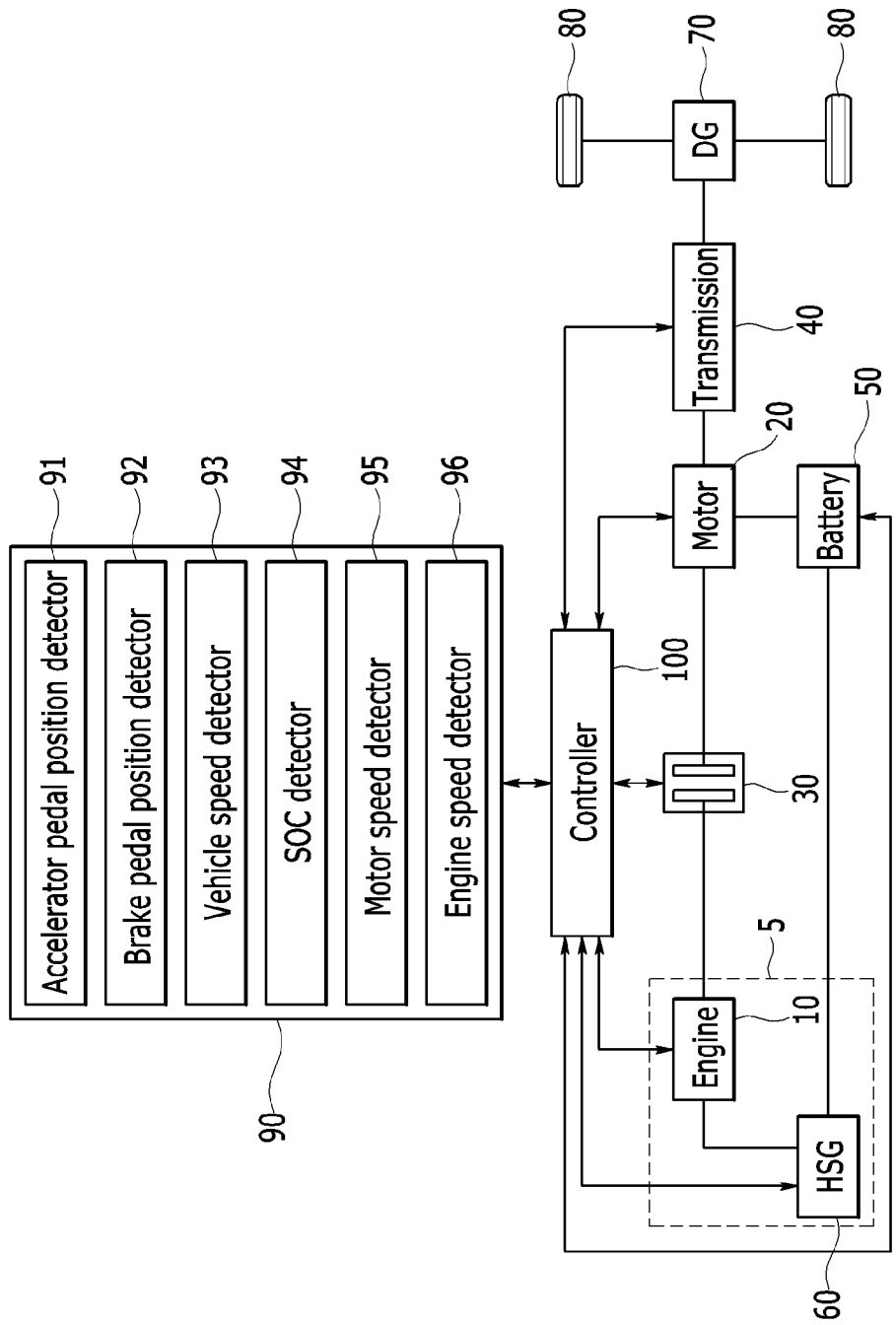
FIG. 1 is an exemplary block diagram illustrating a configuration of a hybrid vehicle according to an exemplary embodiment of the present invention.

10: engine
20: motor
30: engine clutch
40: transmission

50: battery
60: HSG
70: differential gear device
80: wheel
90: data detector
100: controller

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below. Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, the present invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the present invention. In addition, since each component shown in the drawings is arbitrarily illustrated for easy description, the present invention is not particularly limited to the components illustrated in the drawings.

FIG. 1 is an exemplary block diagram illustrating a configuration of a hybrid vehicle according to an exemplary embodiment of the present invention. As shown in FIG. 1, the hybrid vehicle according to an exemplary embodiment of the present invention may include an engine 10, a motor 20, an engine clutch 30 configured to adjust torque between the engine 10 and the motor 20, a transmission 40, a battery 50, a hybrid starter & generator (HSG) 60, a differential gear device 70, a wheel 80, a data detector 90, and a controller 100.

The engine 10 may be configured to combust a fuel to generate power, and various engines such as a gasoline engine, a diesel engine, and an LPI engine may be used as the engine 10. In connection with torque transmission of the hybrid vehicle, torque generated from the engine 10 and the motor 20 may be selectively transmitted to an input shaft of the transmission 40, and torque output from an output shaft of the transmission 40 may be transmitted to an axle via the differential gear device 70. The axle may be configured to rotate the wheel 80 to run the hybrid vehicle by the torque generated from the engine 10 and/or the motor 20.

The battery 50 may be configured to supply electricity to the motor 20 in an EV mode and an HEV mode, and may be charged with electricity recovered from the motor in a regenerative braking mode. The HSG 60 may be configured to start the engine 10 or generate electricity based on an output of the engine 10. The engine clutch 30 may be disposed between the engine 10 and the motor 20. An input shaft of the engine clutch 30 may be connected to the engine 10, and an output shaft of the engine clutch 30 may be connected to the motor 20.

In the present specification, a configuration that includes an engine 10 connected to the input shaft of the engine clutch 30 to generate torque, and the HSG 60 refers to a torque source 5. The data detector 90 may be configured to detect data for operating the engine clutch 30, and the data detected from the data detector 90 may be transmitted to the controller 100. The data detector 90 may include an accelerator pedal position detector 91, a brake pedal position detector 92, a vehicle speed detector 93, a state of charge (SOC) detector 94, a motor speed detector 95, and an engine speed detector 96. In particular, the various detectors may be sensors known to those skilled in the art. The various sensors may be operated by the controller for the controller to detect the data obtained or gathered by the sensors.

The accelerator pedal position detector 91 may be configured to detect or sense a position value of an accelerator pedal (e.g., an engagement degree of the accelerator pedal or an amount of pressure exerted onto the acceleration pedal) and transmit a signal corresponding thereto to the controller 100. When the accelerator pedal is completely engaged, the position value of the accelerator pedal may be 100%, and when accelerator pedal is disengaged (e.g., no pressure is exerted to the pedal or the pedal is released), the position value of the accelerator pedal may be 0%. The brake pedal position detector 92 may be configured to detect or sense a position value of a brake pedal (e.g., an engagement degree of the brake pedal) and transmit a signal corresponding thereto to the controller 100. When the brake pedal is completely engaged, the position value of the brake pedal may be 100%, and when the brake pedal is disengaged (e.g., released), the position value of the brake pedal may be 0%.

The vehicle speed detector 93 may be configured to detect or sense a vehicle speed and transmit a signal corresponding thereto to the controller 100. The vehicle speed detector 93 may be mounted at the wheel 80. The SOC detector 94 may be configured to detect or determine an SOC of the battery 50 and transmit a signal corresponding thereto to the controller 100. Further, the SOC detector 94 may be configured to measure a current and a voltage of the battery 50 to estimate an SOC of the battery 50 therefrom and then transmit such data to the controller. The motor speed detector 95 may be configured to detect a motor speed (i.e., speed of the output shaft of the engine clutch 30) and transmit a signal corresponding thereto to the controller 100. The engine speed detector 96 may be configured to detect an engine speed (i.e., speed of the input shaft in the engine clutch 30) and transmit a signal corresponding thereto to the controller 100.

Moreover, the controller 100 may be configured to adjust the speed of the engine 10 and the speed of the motor 20 based on driving conditions of the hybrid vehicle, and execute the mode switching between the EV mode and the HEV mode. The controller 100 may be implemented with one or more microprocessors executed by a predetermined program. The predetermined program may include a series of commands for performing each step included in a method of controlling the engine clutch 30 according to an exemplary embodiment of the present invention to be described below.

Hereinafter, a method for controlling an engine clutch in a hybrid vehicle will be described in detail with reference to FIG. 2 to FIG. 6.

Figure 2:
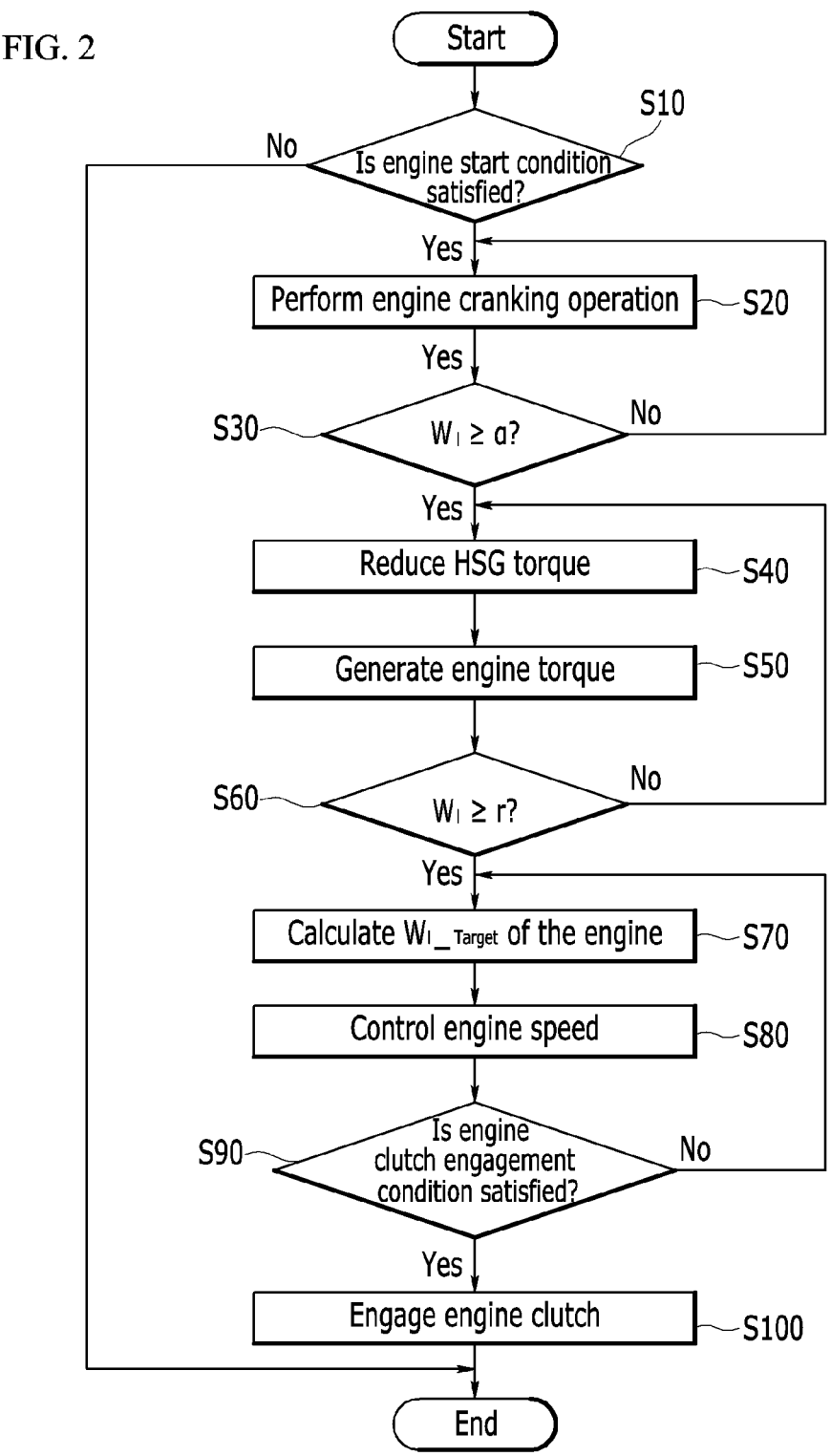
FIG. 2 is an exemplary flowchart illustrating a method for controlling an engine clutch according to an exemplary embodiment of the present invention.
Figure 3:
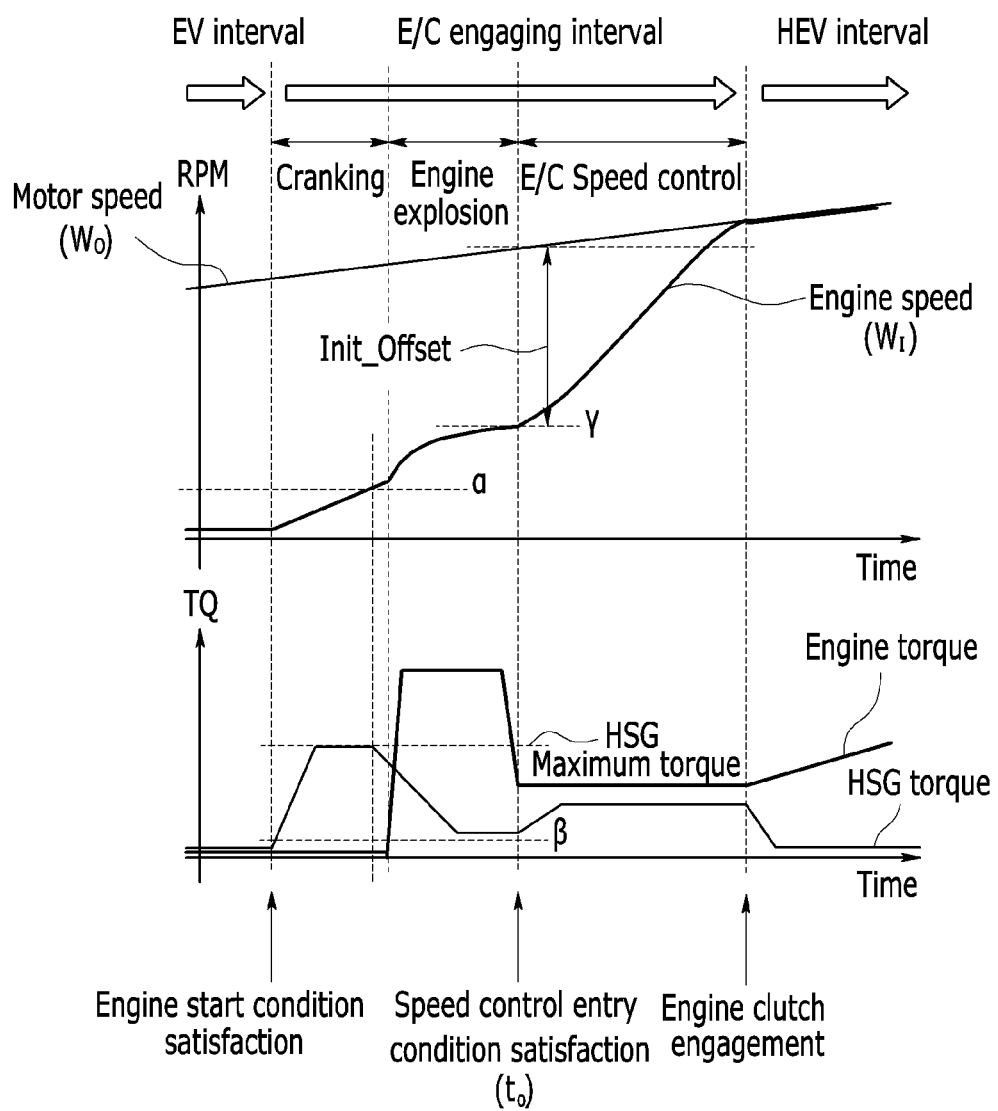
FIG. 3 is an exemplary graph for explaining a method for controlling an engine clutch according to an exemplary embodiment of the present invention.
Figure 4:
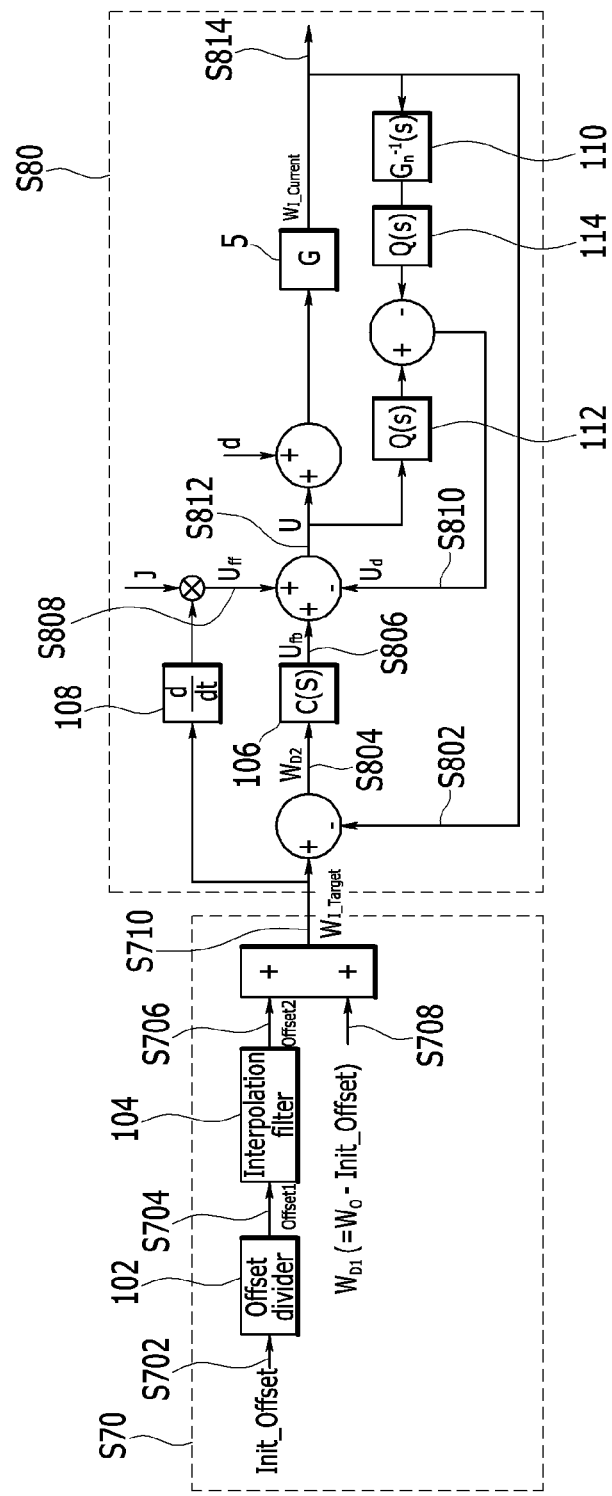
FIG. 4 is an exemplary flowchart illustrating a method for controlling speed of an engine according to an exemplary embodiment of the present invention.
Figure 5:
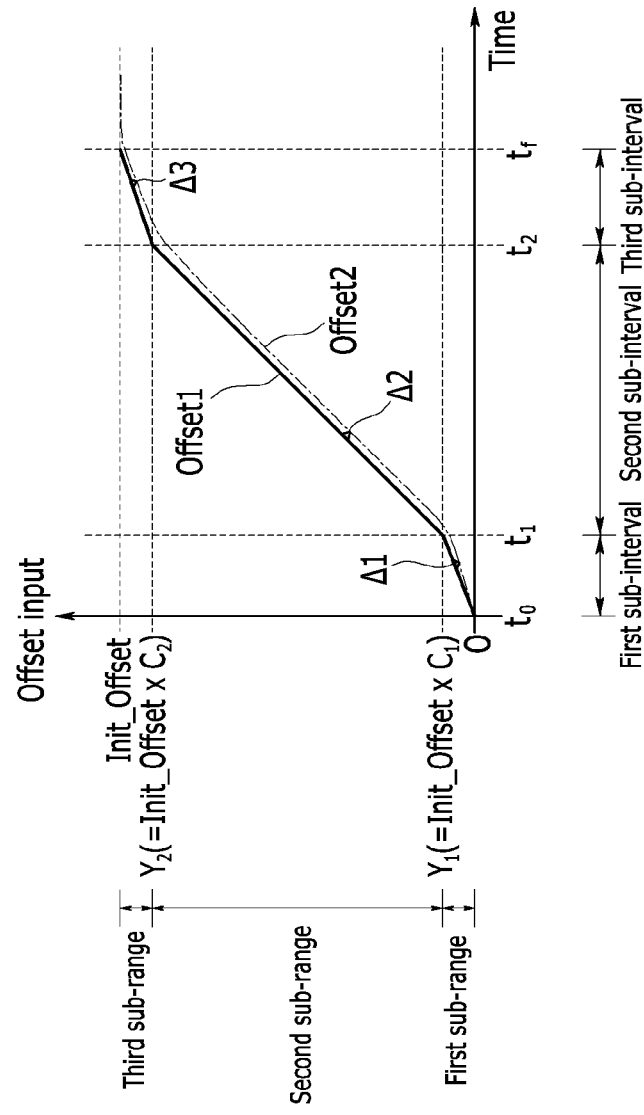
FIG. 5 is an exemplary graph for explaining generation of offset input according to an exemplary embodiment of the present invention.
Figure 6:
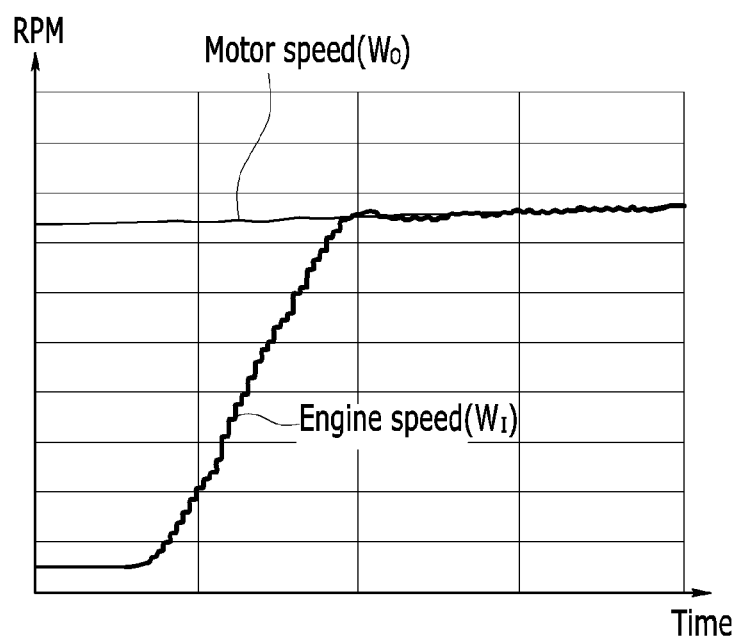
FIG. 6 is an exemplary graph illustrating engine speed and motor speed according to an exemplary embodiment of the present invention.
Figure 7:
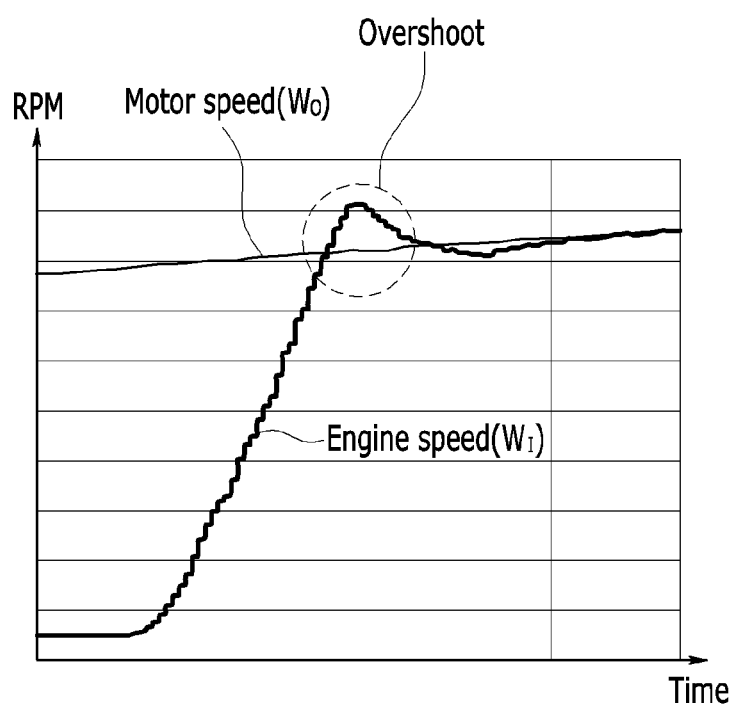
FIG. 7 is an exemplary graph illustrating engine speed and motor speed according to the related art.

FIG. 2 is an exemplary flowchart illustrating a method for controlling an engine clutch according to an exemplary embodiment of the present invention, FIG. 3 is an exemplary graph illustrating a method for controlling an engine clutch according to an exemplary embodiment of the present invention, FIG. 4 is an exemplary flowchart illustrating a method for adjusting speed of an engine according to an exemplary embodiment of the present invention, FIG. 5 is an exemplary graph illustrating generation of offset input according to an exemplary embodiment of the present invention, and FIG. 6 is an exemplary graph illustrating engine speed and motor speed according to an exemplary embodiment of the present invention.

Referring to FIG. 2 to FIG. 6, a method for controlling an engine clutch according to an exemplary embodiment of the present invention may include determining, by the controller, whether an engine start condition is satisfied when the engine 10 is stopped at step S10. The engine start condition may include a condition that requires switching from the EV mode to the HEV mode. For example, the engine start condition may be set by considering demand power of the driver, an SOC of the battery 50, and the like. The demand power of the driver may be calculated based on demand torque and vehicle speed.

When the engine start condition is not satisfied at step S10, the controller 100 may terminate the method for controlling the engine clutch 30 according to the exemplary embodiment of the present invention is terminated. In other words, the engine 10 may be maintained in a stopped state. When the engine start condition is satisfied at step S10, the controller 100 may be configured to perform an engine cranking operation by driving the HSG 60 at step S20. In particular, a controller 100 may be configured to maintain a maximum HSG torque to increase engine speed $W_I$. The maximum HSG torque is a maximum torque that the HSG 60 may output, and may be changed based on the SOC of the battery 50.

Further, the controller 100 may be configured to compare the engine speed $W_I$ with a first reference speed α at step S30. The first reference speed α may be set by a person of ordinary skill in the art based on vehicle type and engine type that are applicable to a method for controlling an engine clutch according to an exemplary embodiment of the present invention. When the engine speed $W_I$ is less than the first reference speed α at step S30, the controller 100 may be configured to continuously maintain the HSG maximum torque.

When the engine speed $W_I$ is greater than or equal to the first reference speed α at step S30, the controller 100 may be configured to decrease an HSG torque at step S40. In particular, the controller 100 may be configured to reduce the HSG torque to about an initial HSG torque command β. The initial HSG torque command β may be an HSG torque command when the controller 100 enters a speed control interval of the engine clutch 30. The initial HSG torque command β may be previously determined by experiments. Particularly, the initial HSG torque command β may be determined by multiplying a sum of a slope of offset input Offset1 in a first sub-interval to be described below and a slope of motor speed $W_O$ by inertia of the input shaft of the engine clutch 30.

The controller 100 may then be configured to generate engine torque using combustion of the fuel at step S50. While generating the engine torque (i.e., during an engine explosion interval), the controller 100 may be configured to determine whether a speed control entry condition is satisfied at step S60. The speed control entry condition may be satisfied when the engine speed $W_I$ is greater than or equal to a second reference speed γ. The second reference speed γ may be initial engine speed at a time when the engine torque may be adjusted. The second reference speed γ may be set by a person of ordinary skill in the art according to vehicle and engine types that are applicable to a method for controlling an engine clutch according to an exemplary embodiment of the present invention.

When the engine speed $W_I$ is less than the second reference speed γ at step S60, the controller 100 may restart from step S40. When the engine speed $W_I$ is greater than or equal to the second reference speed γ at step S60, the controller 100 may be configured to calculate a target speed $W_{I\_Target}$ of the engine 10 at step S70. Hereinafter, a process of generating a target speed profile of the engine 10 will be described in detail.

The time of the satisfaction of the speed control entry condition may refer to an initial time $t_0$. In other words, the initial time $t_0$ may be a time when the engine speed $W_I$ reaches the second reference speed γ. The controller 100 may then be configured to calculate an initial offset Init_Offset based on a motor speed $W_{O\_t0}$ and an engine speed $W_{I\_t0}$ (that is, second reference speed γ) at the initial time $t_0$ at step S702. In particular, the initial offset Init_Offset may be a value determined by subtracting the second reference speed γ from the motor speed $W_{O\_t0}$.

Additionally, the controller 100 may be configured to generate the target speed profile of the engine 10 using the initial offset Init_Offset and the motor speed $W_O$. The controller 100 may include an offset divider 102 and an interpolation filter 104. The controller 100 may be configured to divide the initial offset Init_Offset to generate an offset input Offset1 at step S704. Further, the controller 100 may be configured to interpolate the offset input Offset1 to generate an interpolated offset input Offset2 at step S706. Hereinafter, a process of generating the offset inputs Offset1 and Offset2 will be described with reference to FIG. 5.

The controller 100 may be configured to divide the initial offset Init_Offset to generate the offset input Offset1 in two schemes as follows.

1) Method of Dividing a Range of 0 to the Initial Offset Init_Offset

The controller 100 may be configured to divide the range from 0 to the initial offset Init_Offset into a plurality of sub-ranges. FIG. 5 illustrates that the range from 0 to the initial offset Init_Offset may be divided into three sub-ranges, but the present invention is not limited thereto. The range may be divided from 0 to the initial offset Init_Offset into more or less sub-ranges which is applicable to the technical spirit of the present invention.

The controller 100 may be configured to determine a slope that corresponds to each sub-range, and may be configured to generate the offset input Offset1 which is increased with respect to the determined slope. Since a sudden change in the target speed $W_{I\_Target}$ of the engine 10 may generate slip of a belt that connects the engine 10 to the HSG 60 or overshoot of the engine speed $W_I$, the slope that corresponds to each sub-range may be determined based on such a consideration. For example, the controller 100 may be configured to calculate a first value $Y_1$ that corresponds to a first preset ratio $c_1$ of the initial offset Init_Offset and a second value $Y_2$ that corresponds to a second preset ratio $c_2$ of the initial offset Init_Offset.

Additionally, the controller 100 may be configured to generate the offset input Offset1 which is increased with respect to a first slope $\Delta_1$ until the offset input Offset1 reaches the first value $Y_1$ from 0. The first slope $\Delta_1$ may be determined based on a slope of the engine speed $W_I$ in the engine explosion interval. In other words, the first slope $\Delta_1$ may be determined to prevent overshoot of the engine speed $W_1$ before and after the initial time $t_0$.

When the offset input Offset1 reaches the first value $Y_1$, the controller 100 may be configured to generate offset input Offset1 which is increased with respect a second slope $\Delta_2$ until the offset input Offset1 reaches the second value $Y_2$ from the first value $Y_1$. The second slope $\Delta_2$ may be determined based on the first slope $\Delta_1$ among values satisfying the following Equation 1.

$$\Delta_2 \leq \frac{MaxTQ}{J} \qquad \text{Equation 1}$$

wherein, the MaxTQ is maximum torque that the torque source 5 may output in a current running state, and the J is inertia of the input shaft of the engine clutch 30 (e.g., entire inertia from the torque source 5 to the engine clutch 30). The inertia J may be previously determined by experiments.

When the offset input Offset1 reaches the second value $Y_2$, the controller 100 may be configured to generate offset input Offset1 increased with respect to a third slope $\Delta_3$ until the offset input Offset1 reaches the initial offset Init_Offset from the second value $Y_2$. The third slope $\Delta_3$ may be determined by considering the second slope $\Delta_2$ and a slope of the motor speed $W_O$. In other words, the third slope $\Delta_3$ may be determined to prevent overshoot of the engine speed $W_1$ before and after engagement of the engine clutch 30 is completed. Accordingly, the offset input Offset1 may be generated as a value which is increased as time passes.

2) Method of determining a target time $t_f$ at which engagement of the engine clutch 30 is completed The controller 100 may be configured to determine the target time $t_f$ at which the engagement of the engine clutch 30 is completed based on the initial offset Init_Offset. The controller 100 may then be configured to divide an interval from the initial time $t_0$ to the target time $t_f$ into a plurality of sub-intervals. FIG. 5 illustrates that the interval from the initial time $t_0$ to the target time $t_f$ is divided into three sub-intervals, but the present invention is not limited thereto. The interval from the initial time $t_0$ to the target time $t_f$ may be divided into more or less sub-intervals.

Further, the controller 100 may be configured to determine a slope that corresponds to each sub-interval, and generate offset input Offset1 increased with the determined slope. For example, the plurality of sub-intervals may include a first sub-interval, a second sub-interval, and a third sub-interval. The controller 100 may be configured to determine the first time $t_1$ and the second time $t_2$ to prevent overshoot of the engine speed $W_I$ before and after the initial time $t_0$ and the target time $t_f$. In particular, the controller 100 may be configured to determine the first time $t_1$ and the second time $t_2$ using the following Equation 2 and the following Equation 3.

$$\text{Init\_Offset} = \Delta_1 \times (t_1 - t_0) + \Delta_2 \times (t_2 - t_1) + \Delta_3 \times (t_f - t_2) \qquad \text{Equation 2}$$

$$t_2 = C_3 \times t_1 \qquad \text{Equation 3}$$

wherein, the $c_3$ may be determined by experiments to have a ratio that a person of ordinary skill in the art determines. Similar to the method of dividing the range from 0 to the initial offset Init_Offset, the controller 100 may be configured to determine a first slope $\Delta_1$ that corresponds to the first sub-interval, a second slope $\Delta_2$ that corresponds to the second sub-interval, and a third slope $\Delta_3$ that corresponds to the third sub-interval. In other words, the first slope $\Delta_1$ may be determined by considering a slope of the engine speed $W_I$ in the engine explosion interval, the second slope $\Delta_2$ may be determined by considering the first slope $\Delta_1$ among values satisfying Equation 1, and the third slope $\Delta_3$ may be determined by considering the second slope $\Delta_2$ and the slope of the motor speed $W_O$. Since the initial offset Init_Offset, the initial time $t_0$, and the target time $t_f$ may be determined previously, the controller 100 may be configured to determine the first time $t_1$ and the second time $t_2$ which are two unknown values of Equation 2 and Equation 3.

The controller 100 may additionally be configured to generate offset input Offset1 which is increased with the first slope $\Delta_1$ from the initial time $t_0$ to the first time $t_1$, is increased with the second slope $\Delta_2$ from the first time $t_1$ to the second time $t_2$, and is increased with the third slope $\Delta_3$ from the second time $t_2$ to the target time $t_f$. Accordingly, the offset input Offset1 may be generated as a value that increases as time passes, that is, with respect to time.

While generating the offset input Offset1, the controller 100 may be configured to interpolate the offset input Offset1 using the interpolation filter 104 to smoothly change the offset input Offset1 at step S706. The interpolation filter 104 may include a low pass filter (LPF), but the present invention is not limited thereto. The interpolation filter 104 may use spline interpolation method.

The controller 100 may further be configured to calculate a difference $W_{D1}$ between the motor speed $W_O$ and the initial offset Init_Offset at step S708. The controller 100 may be configured to calculate a target speed $W_{I\_Target}$ of the engine 10 using the motor speed $W_O$ and the initial offset Init_Offset at step S710. In particular, the controller 100 may be configured to add the interpolated offset input Offset2 to the difference $W_{D1}$ to calculate the target speed $W_{I\_Target}$ of the engine 10. When the target speed $W_{I\_Target}$ of the engine 10 is calculated at step S70, the controller 100 may be configured to execute speed control of the engine 10 using the target speed $W_{I\_Target}$ at step S80.

Moreover, the controller 100 may be configured to receive current speed $W_{I\_current}$ of the engine 10 at step S802, and calculate a difference $W_{D2}$ between the target speed $W_{I\_Target}$ of the engine 10 and the current speed $W_{I\_Current}$ of the engine 10 at step S804. The controller 100 may then be configured to calculate feedback control input $U_{fb}$ using the difference $W_{D2}$ at step S806. In other words, the controller 100 may include a proportional integral derivative (PID) controller 106 configured to receive the difference $W_{D2}$ to output the feedback control input $U_{fb}$. However, the spirit of the present invention is not limited thereto. A configuration capable of performing feedback control instead of the PID controller 106 is applicable to the technical spirit of the present invention.

Furthermore, the controller 100 may be configured to calculate feed-forward control input $U_{ff}$ using inertia J of the input shaft of the engine clutch 30 and the target speed $W_{I\_Target}$ of the engine 10 at step S808. In other words, the controller 100 may include a differentiator 108 configured to receive the target speed $W_{I\_Target}$ of the engine 10 to output a differentiation value of the target speed $W_{I\_Target}$. The controller 100 may then be configured to calculate feed-forward control input $U_{ff}$ by multiplying the inertia J and the differentiation value.

The controller 100 may include a nominal inverse model 110 of the torque source 5 and at least one of low pass filters 112 and 114 for removing disturbance (i.e., an unknown term) d. The low pass filters Q(s) 112 and 114 may be designed to satisfy a following Equation 4.

$$Q(s) = \frac{\sum_{g=1}^{m} b_g s^g}{\sum_{h=1}^{n} a_h s^h}$$ Equation 4 wherein, n is greater than or equal to m, $a_h$ and $b_g$ are design parameters and are designed to satisfy the following Equation 5 at a maximum frequency $w_m$ or lower included in the disturbance d.

$$|Q(s=jw)|_{w=w_m} \approx 1$$ Equation 5

The nominal inverse model $G_n^{-1}(s)$ 110 is designed to satisfy the following Equation 6.

$$G_n^{-1}(s) = J \times s$$ Equation 6 wherein, the J is inertia of the input shaft of the engine clutch 30.

In other words, a nominal model of the torque source 5 is designed to satisfy the following Equation 7.

$$G_n(s) = \frac{1}{J \times s}$$ Equation 7

The controller 100 may be configured to calculate disturbance control input $U_d$ using the nominal inverse model 110 and the low pass filters 112 and 114 based on current speed $W_{I\_current}$ of the engine 10 at step S810. The controller 100 may then be configured to calculate a torque command U using the feedback control input $U_{fb}$, the feed-forward control input $U_{ff}$, and the disturbance control input $U_d$ at step S812. The torque source 5 may be configured to generate torque based on the torque command U. The torque command U may be suitably distributed to the engine 10 and the HSG 60.

Additionally, the controller 100 may be configured to receive the current speed torque $W_{I\_current}$ of the engine 10 from the engine speed detector 96 at step S814. As shown in FIG. 6, the engine speed $W_I$ may be increased to be about the same as the motor speed $W_O$. While performing the speed control of the engine 10, the controller 100 may be configured to determine whether an engine clutch engagement condition is satisfied at step S90. The engine clutch engagement condition may be satisfied when the following Equation 8 is satisfied.

$$|W_O - W_I| \leq W_1$$ Equation 8 wherein, the $W_O$ is the motor speed, the $W_I$ is the engine speed, and the $W_1$ is a first preset value.

The first preset value $W_1$ may be set by a person of ordinary skill in the art based on types of vehicles and engine 10 type that are applicable to a method for controlling an engine clutch according to an exemplary embodiment of the present invention. In other words, the controller 100 may be configured to execute speed control of the engine 10 when the engine speed is synchronized to the motor speed. Alternatively, the engine clutch engagement condition may be satisfied when Equation 8 and the following Equation 9 are simultaneously satisfied.

$$\frac{d}{dt}(|W_O - W_I|) \leq W_2$$ Equation 9 wherein, the $W_2$ is a second preset value.

The second preset value $W_2$ may be set by a person of ordinary skill in the art based on types of vehicles and engine 10 type that are applicable to a method for controlling an engine clutch according to an exemplary embodiment of the present invention will be implemented. In other words, the controller 100 may be configured to reduce engagement shock compared to synchronizing the engine speed to the motor speed by engaging the engine clutch 30 when the slope of the engine speed is synchronized to the slope of the motor speed. When the engine clutch engagement condition is not satisfied at step S90, the controller 100 may be configured to continuously execute speed control of the engine 10. When the engine clutch engagement condition is satisfied at step S90, the controller 100 may be configured to engage the engine clutch 30 at step S100. After that, the controller 100 may be configured to execute torque control to satisfy a driver demand torque.

As described above, in accordance with an exemplary embodiment of the present invention, when a mode is switched to the EV mode from the HEV mode, a time required to engage the engine clutch 30 and engagement shock may be reduced by using the speed control of the engine 10.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A method for controlling an engine clutch, comprising:
determining, by a controller, whether an engine start condition is satisfied when an engine is stopped;
performing, by the controller, an engine cranking operation by operating a hybrid starter & generator (HSG) when the engine start condition is satisfied;
determining, by the controller, whether an engine speed is greater than or equal to a first reference speed;
reducing, by the controller, the HSG torque when the engine speed is greater than or equal to the first reference speed;
determining, by the controller, whether the engine speed is greater than or equal to a second reference speed;
calculating, by the controller, a target speed of the engine when the engine speed is greater than or equal to the second reference speed;
performing, by the controller, speed control of the engine using the target speed of the engine;
determining, by the controller, whether an engine clutch engagement condition is satisfied while performing the speed control; and
engaging, by the controller, an engine clutch when the engine clutch engagement condition is satisfied,
wherein the calculating the target speed of the engine includes:
calculating, by the controller, initial offset based on the second reference speed and a motor speed when the engine speed reaches the second reference speed;
dividing, by the controller, the initial offset to generate an offset input; and
interpolating, by the controller, the offset input to generate an interpolated offset input.

2. The method of claim 1, wherein the performing of the engine cranking operation by operating the HSG includes:
increasing, by the controller, the engine speed by maintaining a maximum HSG torque.

3. The method of claim 2, further comprising:
continuously maintaining, by the controller, the maximum HSG torque when the engine speed is less than the first reference speed.

4. The method of claim 1, wherein the dividing the initial offset to generate the offset input includes:
dividing, by the controller, a range from zero to the initial offset into a plurality of sub-ranges;
determining, by the controller, a slope that corresponds to the respective sub-ranges; and
generating, by the controller, the offset input increased with the determined slope.

5. The method of claim 1, wherein the dividing the initial offset to generate the offset input includes:
calculating, by the controller, a first value that corresponds to a first preset ratio of the initial offset;
calculating, by the controller, a second value that corresponds to a second preset ratio of the initial offset;
generating, by the controller, the offset input increased with respect to a first slope until the offset input reaches the first value from zero;
when the offset input reaches the first value, generating, by the controller, the offset input increased with respect to a second slope until the offset input reaches the second value from the first value; and
when the offset input reaches the second value, generating, by the controller, the offset input increased with respect to a third slope until the offset input reaches the initial offset from the second value.

6. The method of claim 5, wherein the first slope is determined by considering a slope of the engine speed when the engine speed reaches the second reference speed.

7. The method of claim 5, wherein the second slope ($\Delta_2$) is determined by considering the first slope among values satisfying an equation of:

$$\Delta_2 \leq \frac{\text{Max}TQ}{J},$$

wherein the MaxTQ is a maximum torque that a torque source including the engine and the HSG outputs in a current running state, and the J is inertia of an input shaft of the engine clutch.

8. The method of claim 5, wherein the third slope is determined by considering the second slope and a slope of the motor speed.

9. The method of claim 1, wherein the dividing the initial offset to generate the offset input includes:
determining, by the controller, a target time when engaging of the engine clutch is completed based on the initial offset;
dividing, by the controller, an interval from the time when the engine speed reaches the second reference speed to the target time into a plurality of sub-intervals;
determining, by the controller, a slope that corresponds to the respective sub-intervals; and
generating, by the controller, the offset input increased with the determined slope.

10. The method of claim 9, wherein the plurality of sub-intervals include a first sub-interval, a second sub-interval, and a third sub-interval, and
a first slope that corresponds to the first sub-interval is determined by considering a slope of the engine speed when the engine speed reaches the second reference speed.

11. The method of claim 10, wherein a second slope 42 that corresponds to the second sub-interval is determined by considering the first slope among values satisfying an equation of $$\Delta_2 \leq \frac{\text{Max}TQ}{J},$$

wherein the MaxTQ is a maximum torque that a torque source including the engine and the HSG outputs in a current running state, and the J is inertia of an input shaft of the engine clutch.

12. The method of claim 11, wherein a third slope that corresponds to the third sub-interval is determined by considering the second slope and a slope of the motor speed.

13. The method of claim 1, wherein the calculating the target speed of the engine further includes:
calculating, by the controller, a difference between the motor speed and the initial offset; and
adding, by the controller, the interpolated offset input to the difference between the motor speed and the initial offset.

14. An apparatus for controlling an engine clutch, comprising:
a data detector configured to detect data used to operate the engine clutch;

a torque source connected to an input shaft of the engine clutch and including an engine and a hybrid starter & generator (HSG); and a controller executed by a predetermined program to operate the engine clutch based on the data, wherein the predetermined program comprises a series of commands for performing a method for operating the engine clutch, the method comprising:

determining whether an engine start condition is satisfied when the engine is stopped;

performing an engine cranking operation by operating the HSG when the engine start condition is satisfied;

determining whether an engine speed is greater than or equal to a first reference speed;

reducing an HSG torque when the engine speed is greater than or equal to the first reference speed;

determining whether the engine speed is greater than or equal to a second reference speed;

calculating a target speed of the engine when the engine speed is greater than or equal to the second reference speed;

performing speed control of the engine using the target speed of the engine;

determining whether an engine clutch engagement condition when satisfied while performing the speed control; and engaging the engine clutch when the engine clutch engagement condition is satisfied, wherein the calculating the target speed of the engine includes:

calculating initial offset based on the second reference speed and a motor speed when the engine speed reaches the second reference speed;

dividing the initial offset to generate an offset input; and interpolating the offset input to generate an interpolated offset input.

15. A non-transitory computer readable medium containing program instructions executed by a controller, the computer readable medium comprising:

program instructions that determine whether an engine start condition is satisfied when the engine is stopped;

program instructions that perform an engine cranking operation by operating the HSG when the engine start condition is satisfied;

program instructions that determine whether an engine speed is greater than or equal to a first reference speed;

program instructions that reduce an HSG torque when the engine speed is greater than or equal to the first reference speed;

program instructions that determine whether the engine speed is greater than or equal to a second reference speed;

program instructions that calculate a target speed of the engine when the engine speed is greater than or equal to the second reference speed;

program instructions that perform speed control of the engine using the target speed of the engine;

program instructions that determine whether an engine clutch engagement condition when satisfied while performing the speed control; and program instructions that engage the engine clutch when the engine clutch engagement condition is satisfied, wherein the program that calculate the target speed of the engine further include:

program instructions that calculate initial offset based on the second reference speed and a motor speed when the engine speed reaches the second reference speed;

program instructions that divide the initial offset to generate an offset input; and program instructions that interpolate the offset input to generate an interpolated offset input.

* * * * *